United States Patent
Simhony et al.

(10) Patent No.: US 12,554,029 B2
(45) Date of Patent: Feb. 17, 2026

(54) APPARATUS AND METHOD FOR OPERATING ELECTRONICS WHILE PROTECTING FROM RADIATION

(71) Applicant: Ramot at Tel-Aviv University Ltd., Tel-Aviv (IL)

(72) Inventors: Yoav Simhony, Tel-Aviv (IL); Erez Etzion, Tel-Aviv (IL); Ofer Amrani, Tel-Aviv (IL)

(73) Assignee: Ramot at Tel-Aviv University Ltd., Tel-Aviv (IL)

( * ) Notice: Subject to any disclaimer, the term of this patent is extended or adjusted under 35 U.S.C. 154(b) by 185 days.

(21) Appl. No.: 18/278,633

(22) PCT Filed: Feb. 25, 2022

(86) PCT No.: PCT/IL2022/050218
§ 371 (c)(1),
(2) Date: Aug. 24, 2023

(87) PCT Pub. No.: WO2022/180636
PCT Pub. Date: Sep. 1, 2022

(65) Prior Publication Data
US 2024/0142645 A1 May 2, 2024

Related U.S. Application Data

(60) Provisional application No. 63/153,994, filed on Feb. 26, 2021.

(51) Int. Cl.
*G01T 7/00* (2006.01)
(52) U.S. Cl.
CPC ..................................... *G01T 7/00* (2013.01)
(58) Field of Classification Search
CPC ... G01T 7/00; G01T 1/24; H02H 3/00; H02H 3/023; H02H 5/005
See application file for complete search history.

(56) References Cited

U.S. PATENT DOCUMENTS

| 5,212,385 A | 5/1993 | Jones |
| 5,672,918 A | 9/1997 | Kimbrough et al. |

(Continued)

FOREIGN PATENT DOCUMENTS

| WO | WO 2017/115050 | 7/2017 |
| WO | WO 2022/180636 | 9/2022 |

OTHER PUBLICATIONS

International Preliminary Report on Patentability Dated Sep. 7, 2023 From the International Bureau of WIPO Re. Application No. PCT/IL2022/050218 7 Pages).

(Continued)

*Primary Examiner* — Kiho Kim

(57) ABSTRACT

Apparatus for protection of electronics in a radiation-prone environment from incoming particles that may cause damage, comprises one or more radiation-detecting layers extending at least partially over one or more sides of a radiation-sensitive electronic device that needs protection, the radiation-detecting layer being configured to obtain an estimate of a characteristic, such as the LET (linear energy transfer), of the incoming particle, A stress assessment unit determines whether the measured characteristic implies a threat to the radiation-sensitive electronic device, and if it does, then a protection module associated with the stress-assessment unit powers down all or part of the radiation-sensitive electronic device within a predetermined time after the incoming particle has been detected, thereby to protect the radiation sensitive electronic device from damage due to the detected particle. The power down is typically completed within a short enough time to avoid damage.

24 Claims, 14 Drawing Sheets

(56) References Cited

U.S. PATENT DOCUMENTS

| | | | |
|---|---|---|---|
| 6,064,555 | A | 5/2000 | Czajkowski et al. |
| 7,166,847 | B2 | 1/2007 | Hannah |
| 2003/0009683 | A1* | 1/2003 | Schwenck ............... G06F 21/87 |
| | | | 713/194 |
| 2006/0000981 | A1 | 1/2006 | Hannah |
| 2009/0231771 | A1 | 9/2009 | Bransford et al. |
| 2014/0097958 | A1 | 4/2014 | Aebersold |

OTHER PUBLICATIONS

International Search Report and the Written Opinion Dated Jun. 13, 2022 From the International Seaching Authority Re. Application No. PCT/IL2022/050218. (12 Pages).

Ley et al. "Frontmatter", Handbook of Space Technology, AIAA, American Institute of Aeronautics and Astronautics, P.I-XXI, Published Online Aug. 29, 2012.

Supplementary European Search Report and the European Search Opinion Dated Jul. 5, 2024 From the European Patent Office Re. Application No. 22759085.8. (9 Pages).

* cited by examiner

APPARATUS AND METHOD FOR OPERATING ELECTRONICS WHILE PROTECTING FROM RADIATION

RELATED APPLICATIONS

This application is a National Phase of PCT Patent Application No. PCT/IL2022/050218 having International filing date of Feb. 25, 2022, which claims the benefit of priority under 35 USC § 119 (e) of U.S. Provisional Patent Application No. 63/153,994, filed on Feb. 26, 2021. The contents of the above applications are all incorporated by reference as if fully set forth herein in their entirety.

FIELD AND BACKGROUND OF THE INVENTION

The present invention, in some embodiments thereof, relates to an apparatus and a method for safely operating electronic equipment in a radiation environment and, more particularly, but not exclusively, to such an apparatus and method that reduces or mitigates radiation-induced errors and faults.

As mankind moves forward towards more frequent human space travel and now employs constellations of tens of thousands of satellites, new technologies are being developed at an ever-increasing pace. Due to the increase in cheap launch opportunities and the availability of large launch vehicles, weight is becoming less of an issue in space systems design and rather rapid design and flexibility are becoming key requirements. The new space technologies must be designed and manufactured at a reduced cost whilst still being able to survive the extreme space environment. Currently the need to adjust electronics for space missions, and the extra design steps required for equipment protection, result in delays of several years between the development of new electronics and computing devices and their integration in space systems.

Radiation prone environments, such as those experienced by satellites in space, and nuclear power plants, are liable to radiation-caused calculation errors and damage to electronic devices, including irreparable damage. In-order to successfully use electronics in such environments, one solution is to use devices that are radiation-hardened by design. This means that all the electronics used for such environments are specifically designed for the constrained conditions. The long time required for radiation hardened systems' design and testing leads to designs based on older, sometimes obsolete technology (non state-of-the-art), difficulties in adapting the circuitry to the specific circumstances and general lack of flexibility to adopt changes without starting the design process over again. The radiation-hardened chips are designed with built-in solutions to avoid having radiation-induced errors at all, thus reducing the damage potential. Again, the design time needed means that the technology is always behind the state of the art, and there is no flexibility to adopt changes without starting the design process all over again.

Another solution is to use radiation-qualified electronic devices. In this solution, devices that were designed for terrestrial use are tested for operation in the radiation environment, and if they happen to pass these tests, they can be used for the radiation environment as well.

The above solutions are time-consuming, expensive and sometimes unsuccessful, and thus hinder projects intended for space and other radiation-prone environments. In particular, it takes long periods of time to design radiation-resilient electronics or determine that a particular design is radiation-proof and thus electronic technology used in such environments necessarily lags the general technology curve.

Certain space missions of short duration may use terrestrial electronics, especially if the mission is in very low earth orbit (VLEO), where the risks are relatively low. The devices may in some cases be protected using a specific current monitoring scheme (as in U.S. Pat. No. 5,672,918A), these solutions are limited to cases of relatively low and non-variable current consumption and have other limitations.

Several attempts have been made to design methods for enclosing satellite electronic equipment in a protective environment, the earliest being Sputnik, Russia's first satellite, which included a nitrogen pressurized container. Although these modules provided a closer-to-terrestrial environment for the contained electronics in respect for example to thermal management, they did not provide a real unobtrusive all-around solution to the conditions of the space environment. Of the different unique environmental conditions in space, the one which is the most challenging to electronic systems is that of space radiation, and specifically the need for resilience to catastrophic single event effects (SEE).

The main challenge pending in developing a complete solution to such an apparatus is to mitigate catastrophic SEEs (CSEEs). Once developed, such an apparatus may be used with already demonstrated solutions that cope with the other unique environmental conditions such as total ionizing radiation, vacuum, microgravity, etc.

CSEEs occur when space radiation stimulates a parasitic mechanism within a semiconductor device leading eventually to its failure. The phenomenon is attributed to a highly energetic particle traversing through the device, releasing charges within it, and triggering a parasitic circuit within the device. This builds up a high-flux current within the device that may result in thermal runaway and eventually to catastrophic (irreversible) damage to the device. An example is shown in FIGS. 1A and 1B, taken from Latent damage in CMOS devices from single-event latchup, Heidi N. Becker, Tetsuo F, Miyahira, Allan H, IEEE transactions on nuclear science, vol 49, no 6, December 2002, which illustrate latent damage from a single event of a phenomenon known as latch-up caused by an SEE. Apparent in FIGS. 1A and 1B are aluminum spheres, cracking of the insulator, and other damage caused by the SEE.

As outlined above, over the years, two main strategies to mitigate SEEs have been implemented. Both strategies are implemented on the component level and not the board or subsystem level. The first strategy is to design radiation-hardened parts and the second is to qualify commercial off-the-shelf (COTS) or Military Standard (MIL-STD) parts for use in the space environment.

The first strategy involves designing radiation-hardened integrated circuits (IC chips) or redesigning non-radiation-hardened chips to survive the space environment, including withstanding radiation. This is done by implementing chip design-blocks that mitigate radiation-induced failures by-design. After completing design and production, these components must be qualified by means of radiation testing e.g. in a particle accelerator test-beam facility. These procedures are cumbersome and take years, sometimes necessitating several iterations, thus resulting in a chip several orders of magnitude more expensive than the same terrestrial chip and lagging several years behind current state of the art technology. To that, one may additionally take into account the time required to design a circuit board to accommodate the chip, test it and integrate it into the satellite system. Effectively, this sometimes results in satellites on the launch-pad being a decade or more behind current technology.

The second strategy relies on the rapidly evolving commercial market to produce a large array of chips for terrestrial uses. It turns out, that by chance, some of these chips can be qualified for use under certain space conditions without design modifications. Of the commercial market, the cellular phones and car industry are leading the way towards higher performance, higher reliability, and lower cost chips and systems. These commercial off-the-shelf devices are built for terrestrial and atmospheric use and are not designed for utilization in space. Since radiation effects are typically excluded from COTS design practice, withstanding radiation and SEE is coincidental and unforeseen. Despite that, if a manufacturing batch of devices successfully passes radiation and other testing, it may be qualified for use in space, albeit sometimes with limitations (voltage limitations, specific satellite orbits and lifetime, etc.). This strategy is also time and money consuming. A limitation of this method is that the tested device might not pass the tests, and even if it does, qualifying a specific batch of devices does not guarantee that other batches of the same device will tolerate the same space environment conditions. Thus, other batches of an already qualified device are not guaranteed to be successfully qualified as well. Hence, this strategy requires strict inventory management and procurement or recurring tests.

In some cases, there are no adequate radiation-qualified COTS components. To address these issues, in some cases, specific tailor-made solutions are required to mitigate radiation induced faults and enable operation in space. These solutions include protecting the sensitive components with radiation absorbing materials to decrease the Total Ionizing Radiation (TID) and mitigating SEE through custom in-board current sensing and clamping circuit design.

The custom electronic circuits required for SEE mitigation usually comprise of current sensing modules aimed at detecting a sudden increase in current drawn by the device. When such a current increase is detected, the circuit disconnects the sensitive devices from power and sometimes additionally activates a voltage clamp to shut-down the power to the device. Solutions of this sort require the design of a dedicated board with space grade/qualified components and tailor-made SEE detection and mitigation circuitry onboard. This also results in long design cycles and low flexibility. In addition, upgrading to new and improved components requires repeating the board and sub-system design, testing and manufacturing processes as it is very unlikely that a non-space designed board will have no radiation sensitive electronic devices.

Furthermore, this method is only viable for components with a relatively low and stable current draw. For example, micro latch-up phenomena are potentially catastrophic and might only increase a part's current draw by a small amount (e.g. 50 mA). A high-power graphics processing unit (GPU) (e.g. consuming 5A) may be very hard or impossible to protect in this way, especially if different modes of operation are employed, for which different currents are drawn by the device. Namely, it may often be practically impossible to use a current monitor to distinguish between current fluctuations resulting from proper device operation, and those caused by SEE.

Existing art that protects electronics in radiation environments includes U.S. Pat. No. 5,672,918A, entitled System Level Latch-up Mitigation for single event and transient radiation effects on electronics, which discloses radiation measurement and current measurement leading to detection of either an external high flux event or of an internal excess current flow, causing the system to "blink". U.S. Pat. No. 6,064,555 is entitled Radiation Induced Single Event Latch-up Protection and Recovery of Integrated Circuits and teaches an obtrusive built-in radiation detector. U.S. Pat. No. 7,166,847 is entitled System with Response to Cosmic Ray Detection and also teaches an obtrusive radiation detector. US 2006/0000981 also entitled Cosmic Ray Detectors for Integrated Circuit Chips is a further development of the radiation detector. US20180248351A1, published in 2018 protects from radiation by characterizing surge current in the circuitry.

Another solution is found in US 2018/0248351A1 published in 2018, which analyzes the current taken up by a card or component, particularly identifying surge currents. Again, this leaves open the issue of complex devices such as GPUs, where it is hard to distinguish between changes in current due to normal operation and surges.

Thus, none of the above solutions really allow free selection, without testing, of COTS to be used in space or in other radiation-prone environments such as nuclear power plants.

SUMMARY OF THE INVENTION

The present embodiments may overcome these limitations and address the issue of the use of COTS components in space and any other radiation-prone environment by employing an unobtrusive solution that detects incoming radiation particles and assesses their level of threat, powering down the electronics in those cases where the incident particle poses a threat to the electronics. The present embodiments may thus allow use of COTS electronic components on a board-level and subsystem-level, as well as a component level, whilst mitigating SEE. It may thus be possible to shorten space avionics design time, reduce its costs, allow the use of state-of-the-art technology in radiation-prone environments, and allow for flexibility in replacing and upgrading the devices, boards or sub-systems.

The electronics being protected may comprise chip or board mounted components, including multiple chips mounted on a card, and references herein to electronics, devices, chips, cards and components, all refer to various items of electronics which may be protected by the present embodiments.

The present embodiments may consequently allow the use of state-of-the-art parts in space applications and generate flexibility by enabling the upgrade of satellite boards and subsystems with little design penalty. The present SEE mitigation solution can be used exclusively or in conjunction with other solutions such as current (and/or current surge) sensing circuit mitigation techniques, hot redundancy, testing for radiation sensitivity, selective testing etc. These techniques may be employed independently or with an integrating system and algorithm. Such a system may, for example combine measurements of current surge detection with incident particle characterization.

The present embodiments may provide a way of containing electronics within a reactive protective environment, and thus allow for the free use of COTS technology in environments that are exposed/liable to hazardous radiation.

The present embodiments may provide apparatus and methods for detecting and characterizing individual radiation-particles in real-time, after the particles impinge the apparatus and the protected device, but before thermal or other damage is induced in the device. Accordingly, protective activities such as an immediate power-cycle, may be exercised or procedures to cope with an induced error may be activated, such as recomputing a jeopardized computation or memory cell.

The present embodiments may operate by directly detecting and characterizing space radiation impinging the electronics instead of detecting and characterizing the symptoms of the parasitic effect on sensitive parts (e.g. by sensing current consumption of a sensitive part). By employing particle radiation detectors, the apparatus detects and characterizes impinging radiation and through built-in signal processing assesses the risk of damage to the electronics. In events where an unacceptable risk of a catastrophic SEE to the electronics is detected, the apparatus may immediately perform a power-cycle, thus mitigating the damage that may occur. The apparatus may balance between the need for continuous operation of the electronics and the need to mitigate the risk of SEE. The apparatus may also warn against non-catastrophic SEE, such as Single Event Upsets (SEU), which in conjunction with algorithms within the processing electronics or the use of hot redundancy, etc., may be able to help mitigate these errors as well.

The above embodiments may also be implemented in terrestrial sensitive devices such as quantum devices and computers, which are computationally sensitive to terrestrial radiation such as cosmic muons.

According to an aspect of some embodiments of the present invention there is provided apparatus for protection of electronics in a radiation-prone environment from incoming particles liable to cause damage via energy deposition, the apparatus comprising:

at least one radiation-detecting layer covering at least partially at least one side of at least one radiation-sensitive electronic device to be protected, the at least one radiation-detecting layer being configured to obtain an estimation of at least one characteristic of an incoming particle;

a stress assessment unit configured to determine whether the measured at least one characteristic of the incoming particle implies the particle may be a threat to the radiation-sensitive electronic device; and a protection module associated with the stress-assessment unit and configured to power down the radiation-sensitive electronic device within a predetermined time after the incoming particle has been detected, thereby to protect the radiation sensitive electronic device from damage due to the detected particle, or to issue an indication that a current operation of the at least one radiation-sensitive electronic device is unreliable.

In an embodiment, the predetermined time is within an order of magnitude of a millisecond.

In an embodiment, the radiation detecting layer is a monolithic detector or a position-sensitive detector.

Embodiments may comprise second, third and more radiation detecting layers, the first and second and third detecting layers being on at least one side, or at least two sides or at least three sides, or at least four sides or at least five sides or six sides of the protected device. This includes mix and match embodiments with different numbers of detecting layers on different sides.

Embodiments may include four or radiation detecting layers on one or more sides, including at least four radiation detecting layers on a first side, or at least four radiation detecting layers on at least two sides, or at least four radiation detecting layers on at least three sides, or at least four radiation detecting layers on at least four sides, or at least four radiation detecting layers on at least five sides, or at least four radiation detecting layers on six sides of the protected device.

In an embodiment, the radiation detecting layer or layers are configured to obtain a track of the detected particle and/or wherein the protection module is configured to power down the device only if the at least one device is aligned with the track.

In an embodiment, the radiation detecting layers are configured to determine a type of the detected particle and/or determine an energy of the detected particle.

In an embodiment, the protection module is configured to determine whether a given portion of a device is at risk and to power down the portion without powering down other portions of the device or other devices.

Embodiments may include a current detection unit to detect a current surge in the device, the protection module configured to power down the radiation sensitive electronic device only if the implied threat is combined with the detected current surge.

In an embodiment, the stress assessment unit may consider an angle at which the incoming particles approach the radiation sensitive device, thereby to determine a path length of the incoming particles within the radiation sensitive device, the path length including an estimate as to whether a particle will be stopped within the radiation-sensitive electronics, in order to estimate a linear energy transfer (LET) of the particle.

In an embodiment, the stress assessment unit is configured to consider an energy absorbed by the at least one radiation detecting layer in order to estimate an LET of a respective particle.

In an embodiment, the at least one radiation-sensitive electronic device to be protected comprises a plurality of the radiation-sensitive electronic devices in a plurality of device layers.

Embodiments may include an additional radiation detecting layer between the device layers.

In an embodiment, the position sensitive detector comprises a plurality of pixel sensors.

Some embodiments may include two or more radiation sensitive devices, wherein a first one of the radiation sensitive devices is at least partially covered by a position sensitive detector and a second one of the radiation-sensitive devices is at least partially covered by a monolithic detector.

Powering down may involve clamping a rail or node to ground.

Powering down may involve disconnecting a power input.

Embodiments may comprise at least one radiation detecting layer on each of six sides surrounding the at least one radiation sensitive device, thereby to form a closed capsule whose outer walls are radiation detecting layers.

In an embodiment, the characteristic of the incoming particle that is detected may be any of a measurement of the deposited energy, an estimation of the LET, and which of the radiation detection layers has been traversed by the particle.

According to a second aspect of the present invention there is provided a method for protection of electronics in a radiation-prone environment from incoming particles liable to cause damage, the method comprising:

placing a layer covering at least partially at least one side of at least one radiation-sensitive electronic device to be protected;

at the layer detecting incoming particles;

obtaining a measurement of an energy characteristic of the incoming particle;

determining whether the characteristic of an incoming particle implies a threat to the radiation-sensitive electronic device; and powering down the radiation-sensitive electronic device within a predetermined time after the incoming particle has been detected, thereby to protect the radiation sensitive electronic device from damage due to the detected particle, or providing an indication that a current operation carried out by the radiation sensitive electronic device is unreliable.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DESCRIPTION OF SPECIFIC EMBODIMENTS OF THE INVENTION

The present invention, in some embodiments thereof, relates to apparatus and a method for safely operating electronics in a radiation environment and, more particularly, but not exclusively, to such an apparatus and method that reduces or eliminates radiation-induced errors and faults.

The present embodiments may provide an apparatus for protection of electronics in radiation-prone environments from incoming particles, which comprises at least one radiation-detecting layer covering at least one side of a radiation-sensitive electronic device that needs protection. The radiation-detecting layer is configured to obtain a measurement of the deposited energy and an estimate of the linear energy transfer (LET) of the incoming particle when traversing through the device. The measurement may optionally be combined with a measurement of surge current in the device. A stress assessment unit/algorithm determines whether the estimated LET within the radiation-sensitive electronic device implies a threat to the radiation-sensitive electronic device, and if it does then a protection module associated with the stress-assessment unit powers down the radiation-sensitive electronic device within a predetermined time after the incoming particle has been detected. With that it protects the radiation sensitive electronic device from damage due to the incoming particle. The power down is completed within a short enough time to protect the device. Typically, power down may be implemented within a millisecond from the moment the particle traverses through the sensitive component, but may be different, depending on the design and the devices to be protected.

The combination of characterizing the impinging particle with measurement of the surge current may give an improved prediction of the risk of a CSEE with reduced risk of a false positive error.

Figure 3:
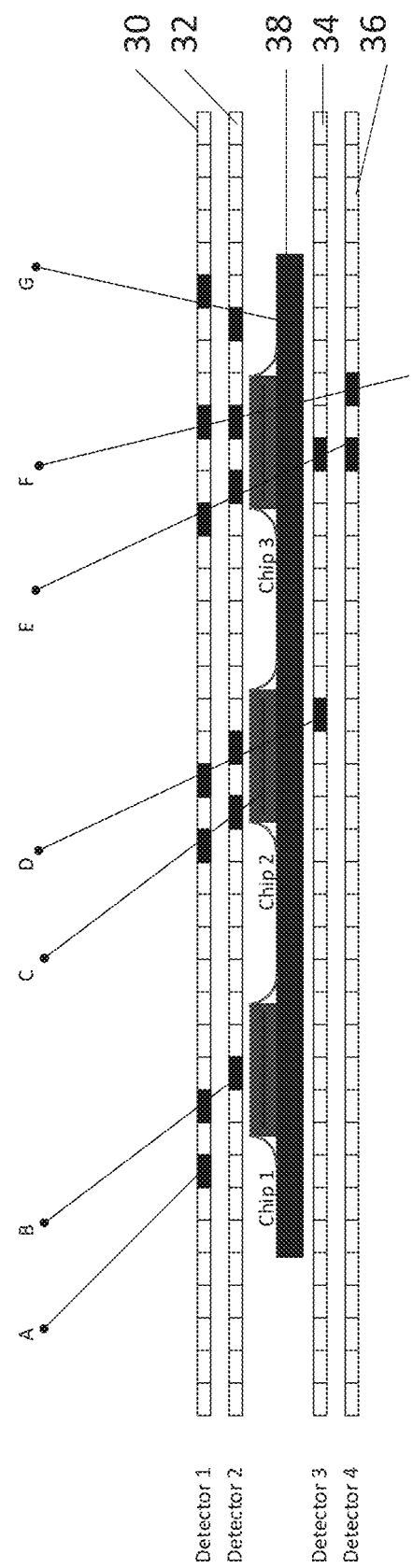
FIG. 3 is a simplified 2D cutout diagram showing a series of chips on a card protected by four detector layers according to embodiments of the present invention.
Figure 11:
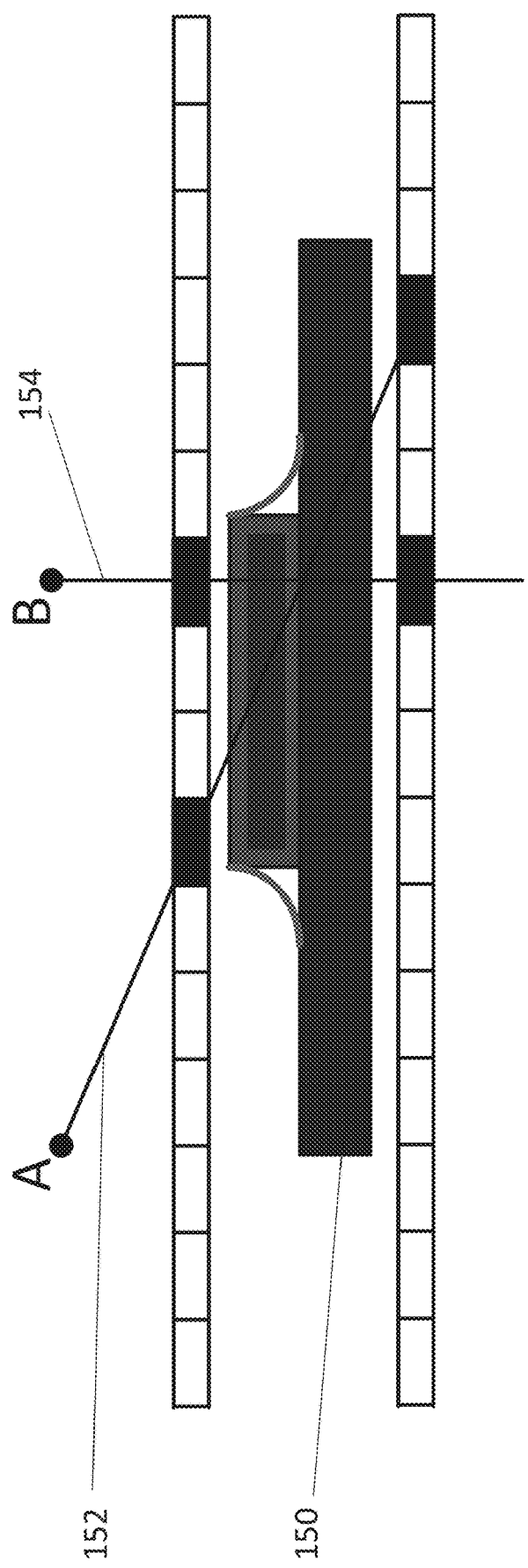
FIG. 11 is a schematic diagram showing different paths for incoming particles through an electronic component and showing how the path taken can influence the energy imparted.

In-order to more accurately detect and characterize an incoming radiation particle, the protected device may be enclosed within one or more radiation detectors. These detectors may be monolithic, thus only detecting and characterizing particles impinging on the apparatus and their energy deposit at each layer, or polylithic, thus also providing the particles' tracks, which allows precise preventive-action decision-making by taking into account the radiation sensitivity of the specific electronic devices within the particles' paths as shown in FIG. 3 and the angle of incidence, as shown in FIG. 11.

The present embodiments may make use of radiation detectors for individual particle detection and characterization. The apparatus may provide real-time handling of destructive and non-destructive single-event errors. The present embodiments may implement protection of the electronic devices without intervening with micro-electronic design and packaging, and without requiring any changes to the electronic circuits or boards themselves, since the protection may be provided by an external apparatus to all devices requiring protection on the boards.

The present embodiments may implement particle tracking, and thus may minimize the protective action taken to be as limited as possible to the circuits threatened, thus minimizing effects of the protective measures on the continuous operability of the protected device.

The apparatus of the present embodiments may be used alone or with other error mitigating solutions, such as current monitoring (or surge current monitoring as in US20180248351A1), radiation testing and qualification, cold redundancy, hot redundancy etc. Several such methods may be implemented independently or with an integrated decision making algorithm.

Apparatus according to the present embodiments may allow use of non-radiation-hardened, or non-radiation qualified devices in space and nuclear applications, thus meaning that off-the-shelf electronic products may be considered for use and radiation testing and qualification, with all the time delays involved, may be avoided. In general the present systems may shorten the design time to get electronics into such environments, improving flexibility in design, testing, and purchasing.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1B:
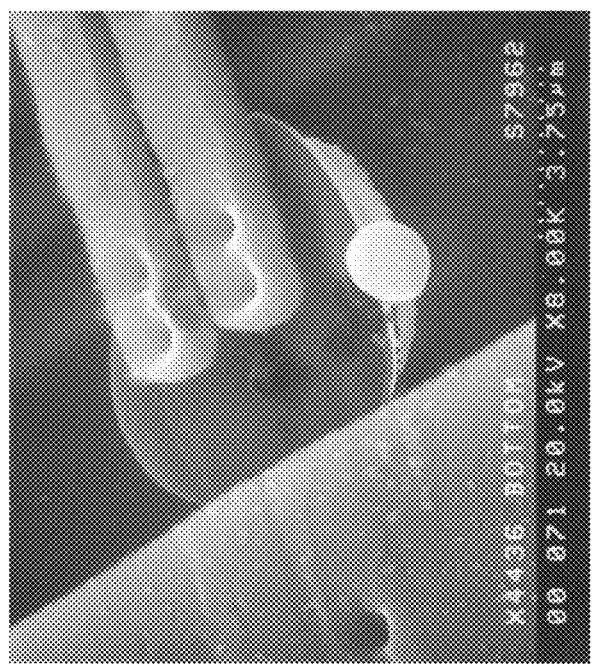
FIGS. 1A and 1B are two views of damage that to semiconductor based electronics by ionizing radiation.
Figure 1A:
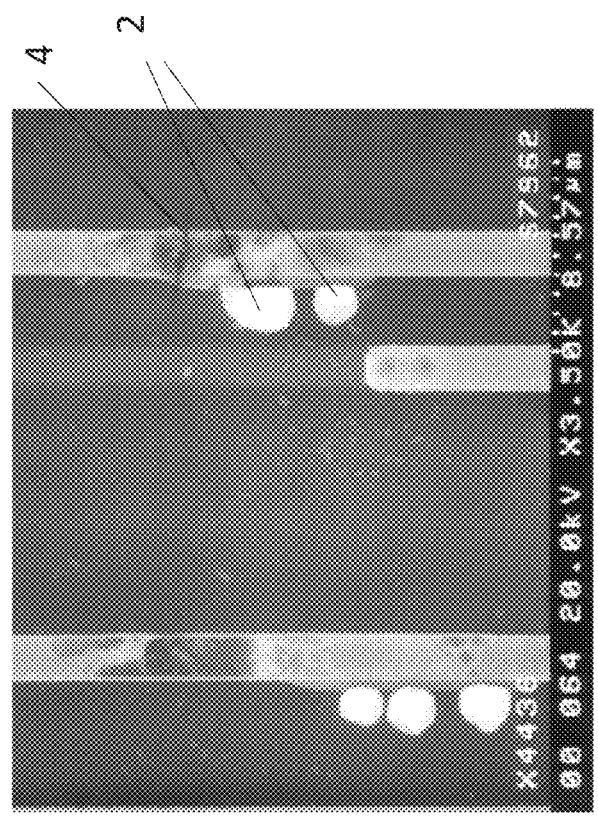

Referring now to the drawings, FIGS. 1A and 1B, illustrate the problem that a radiation environment causes for semiconductor-based technology. Latent damage is shown from a single latch-up event in the semiconductor caused by an SEE. Apparent are aluminum spheres 2, cracking of insulator 4, and other damage.

Figure 2:
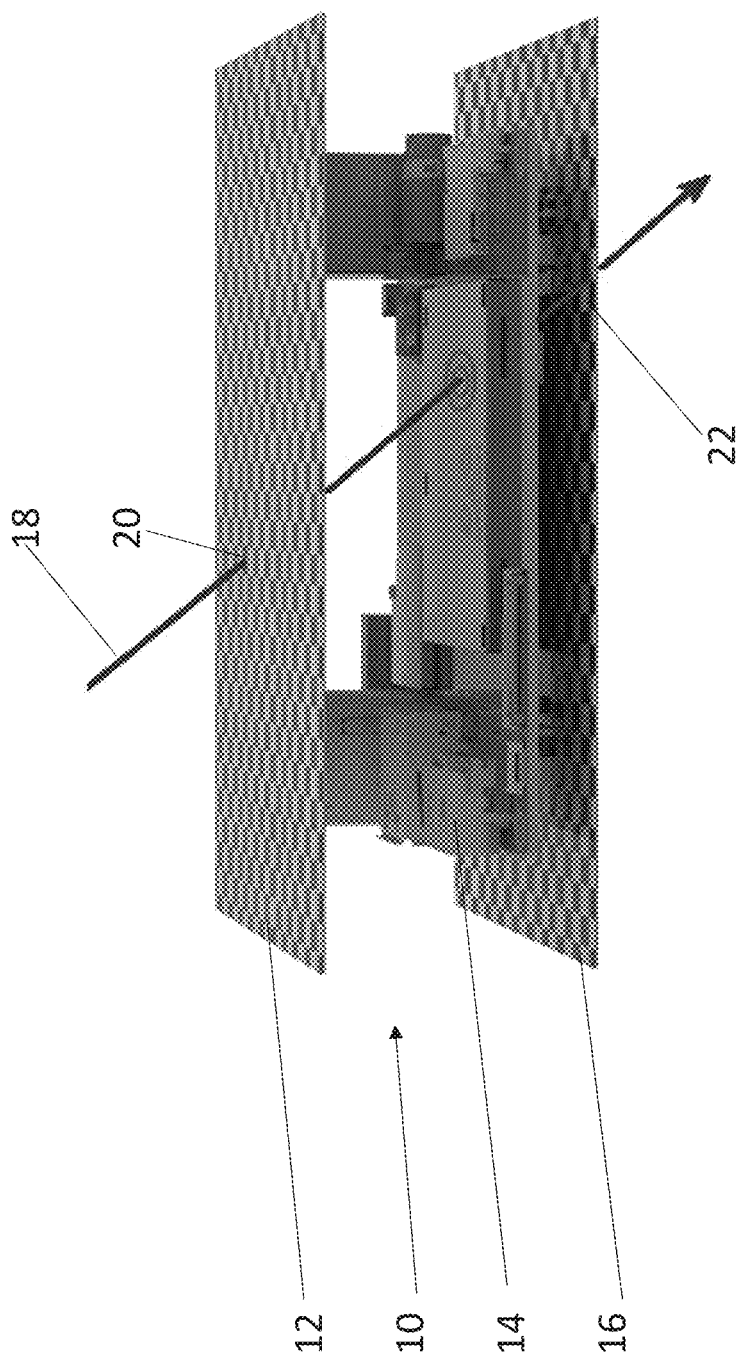
FIG. 2 is a simplified 2D cutout diagram of a capsule for protecting electronics in a hazardous environment according to an embodiment of the present invention.

Referring to FIG. 2, a conceptual device 10 according to the present embodiments is shown. A first layer 12 of radiation detectors lies over one side of commercial electronic equipment 14. A second layer 16 of radiation detectors lies over a second side of the commercial electronic equipment, each layer containing individual pixel sensors arranged as a matrix. As shown, two pixel sensors, 20 in layer 12 and 22 in layer 16, are set off by a particle whose path is indicated by arrow 18, and which particle also strikes the electronic equipment 14. Specifically, by interpolating from the pixel the particle crosses the first layer 12 and the second layer, 16, one can calculate if the particle is expected to go through the sensitive electronic protected device and one can estimate the exact hit position. The pixel sensors, which are arranged as a matrix over the layer, may form a position-sensitive detector.

It will be appreciated that in practice the electronics would most frequently be protected from all six sides, and the apparatus of the present embodiments would be provided as a capsule.

The pixel sensors 20 and 22 of layers 12 and 16 respectively may detect the location of the particle and accordingly the path and the energy deposited by the particle, and accordingly it may be possible to estimate a parameter referred to as LET measured in MeVcm$^2$/mg. This gives the quantity of energy that the particle deposits per unit length through the material (divided by the material's density). The LET depends on the type of particle as well as the type and density of the material being struck, and the particle's energy. The detectors not only determine the location of the particle but since there may be at least two detectors, the path of the particle may be determined. It may thus be determined whether the particle has passed through a sensitive component or not and thus whether there is a danger of a catastrophic single event error, for example an event capable of causing a latch-up.

It is noted that the path of the particle may be calculated first before estimating the LET, since the path of the particle through the detectors influences the amount of energy released into and measured by the detectors.

The CSEE begins immediately with the impact of the particle on the radiation-sensitive device, however the damage to the device is somewhat delayed in relation to the impact of the particle, as the damage effect is primarily thermal damage and thus there is a short reaction period until catastrophic damage actually develops. The delay is device-dependent and is typically longer than a millisecond but may be more or less depending on the device and the area in the device that was triggered. Accordingly, the capsule of the present embodiments has a small amount of time, which may be of the order of a millisecond from detection of the particle, in order to prevent the damage from occurring.

The signal processing logic used for the stress assessment, and associated with the sensors, estimates the characteristics of the particle, the place of the impact of the particle and the particle's track, and also knows the layout of the electronics in the impact zone and possibly more information on some of the component sensitivity to radiation, measurements of the general current drawn etc. A decision is thus taken as to whether to induce a power cycle. Powering down removes the current source and thus removes the threat of damage and then the power may be turned on again in a power cycle. The power being turned off, for example within less than a millisecond of the strike depending on the material, may prevent any thermal damage to the electronics, which are now able to continue the mission.

Reference is now made to FIG. 3, which is a cross-sectional view of a capsule according to the present embodiments. Here it is noted that there are two layers of detectors above, 30 and 32, and two layers of detectors below 34 and 36, the electronic equipment 38, which measure the energy deposited into them by the particle. The detectors thus determine both the path and the energy deposited by the incoming particle. The three electronic components, chips 1 . . . 3 may have the same or different sensitivity thresholds to radiation, which may be known in advance or may be estimated.

Figure 13:
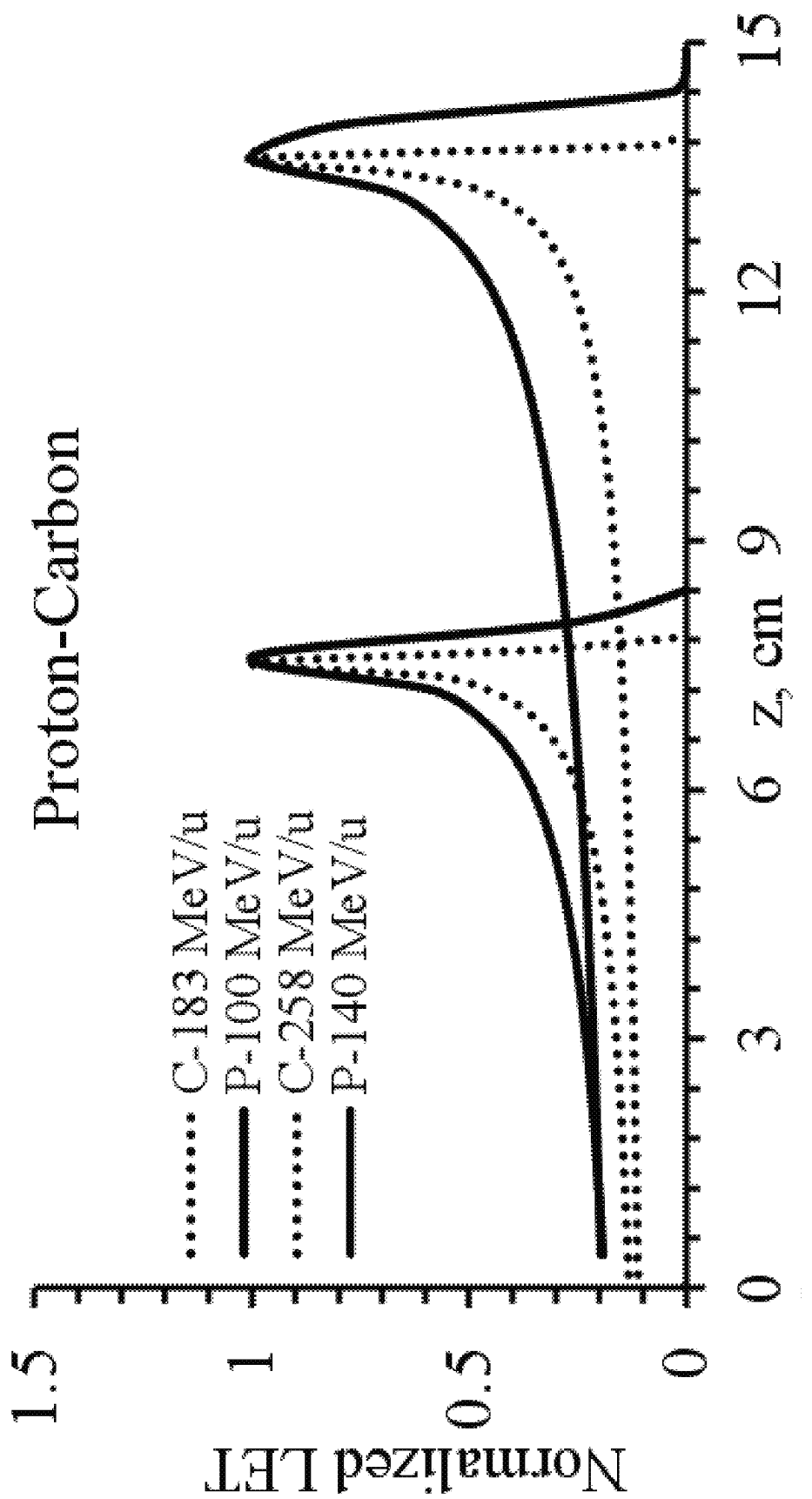
FIG. 13 is a graph illustrating normalized LET against distance travelled in matter, showing that the particle is characterized by the highest LET two or so centimeters prior to stopping.

Paths A . . . G of striking particles are shown. Particle F goes right through, but the other particles are stopped at some point, since each particle may be of a different type, energy etc. Particles may also strike from below, or from the sides, and are treated the same as those from above, except for considerations due to the mechanical structure. For example particles from below may strike the circuit board before reaching the components, thus reaching the components with a different energy and a different LET. A particle that is stopped within a component releases a relatively high energy per distance traveled within the device, thus it is more likely to produce a CSEE, whereas a higher-energy particle that is merely slowed down generally releases much less energy per distance traveled. FIG. 13 shows normalized LETs for various particles against thickness of material penetrated until all the particle's energy is transferred, and it is clear that for all of the particles shown, the particle is characterized by the highest LET during the final two or so centimeters of the particle's travel.

Returning to FIG. 3, particle A is absorbed by the first detector, which is deduced from the fact that no detection is made at the second layer, hence no power cycle is needed.

Particle B penetrates both initial layers 30 and 32 of detectors but it is not detected at detector 3, so it is not actually known if it reaches the electronic component. In the absence of other information, such as knowledge of the type of particle and/or say an ability to confirm that all of its energy has been deposited in the first two detectors, a power cycle may be considered, although in this case, it will be a false positive decision.

Particle C likewise penetrates both upper layers of detectors 30 and 32, but is not detected in the third layer 34 below the electronics. The first two detectors estimate the LET and the particle track. The fact that no particle is detected in the third layer 34 should lead us to understand that the particle came to a complete stop within detector 2 or within the electronics. It might then be assumed that a quantity of energy equivalent to much of the kinetic energy of the particle has been imparted to the components. Accordingly, a power cycle may be carried out appropriate. In this case, power-cycling is a true-positive decision.

In fact, both particles B and C look identical to the detectors and are treated in the same way.

Particle D passes three layers of detectors 30, 32 and 34 and a component. The particle's LET both above and below the component can be measured and hence the particle's LET at the component may be estimated thereby assisting the decision to perform a power cycle.

Particle E passes through all four detectors 30, 32, 34 and 36, as well as a component. The particle's LET is thus known relatively accurately, and thus a power cycle may or may not be introduced with maximal information and minimal chance of a false alarm and minimal chance of error.

Particle F is similar to particle E, except that layer 34 fails to make a detection. Given that in this case the particle is detected in layer 36, the failure to observe anything in layer 34 is an error. The detectors may indeed have imperfections, and algorithms may be adapted to deal with detection errors, so that even in such cases, the need for a power cycle may be accurately estimated.

Particle G does not pass through a sensitive component and thus, if particle track estimation is employed, does not trigger a power cycle, irrespective of its LET.

Figure 4:
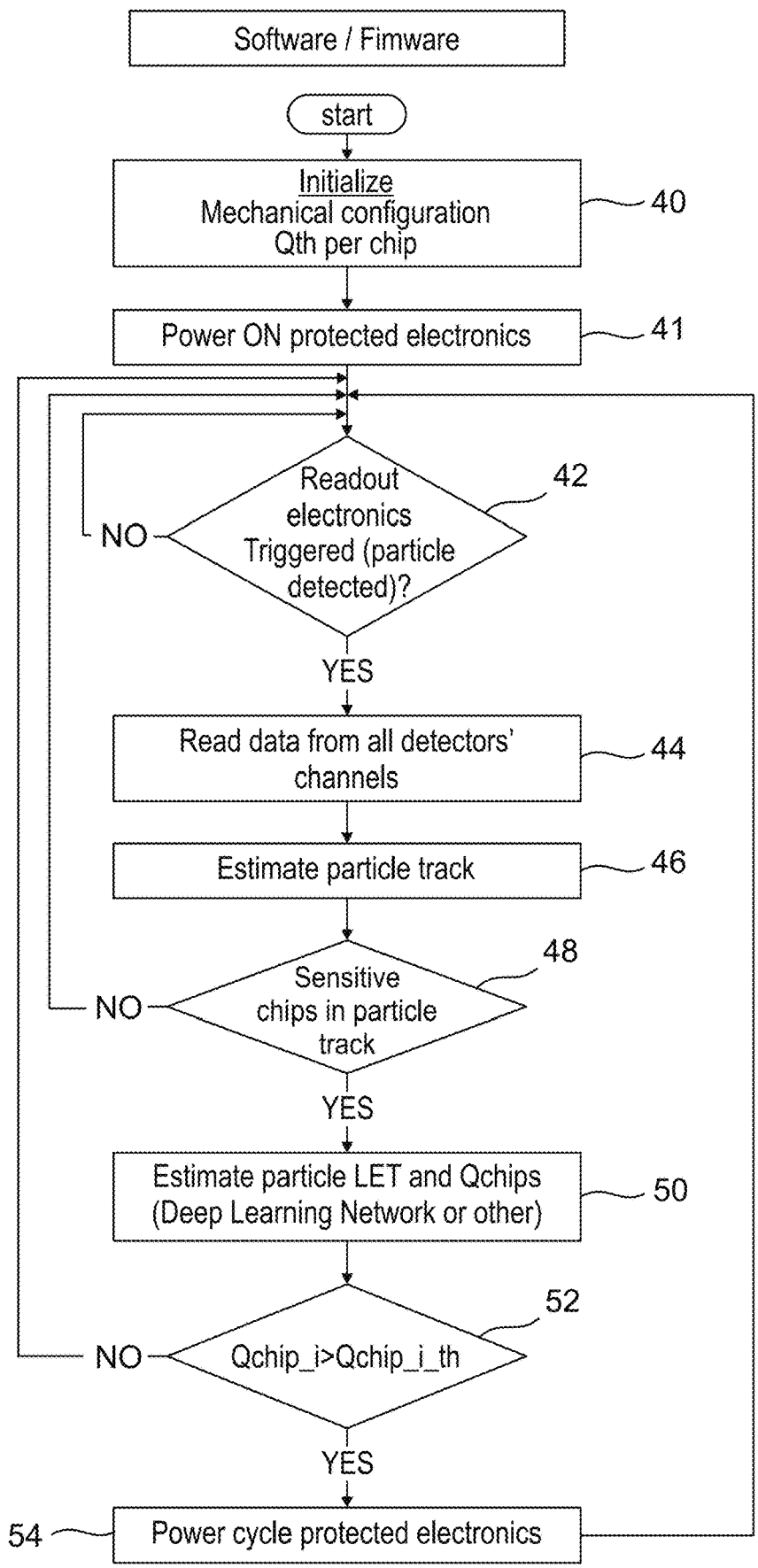
FIG. 4 is a simplified flow chart of operation of an embodiment of the present invention to protect sensitive electronics when an ionizing particle is detected.

Reference is now made to FIG. 4, which is a flow chart illustrating the operation of the protective apparatus according to the present embodiments. The decision as to whether to introduce a power cycle may depend on the measurements taken as well as threshold data about the component being protected. The threshold data may be measured per device or estimated per technology or based on knowledge on similar devices, etc., or may for example be based on a worst case scenario of the device being sensitive to a relatively low LET.

In general, one embodiment provides a procedure based on machine learning, in which the layout of the capsule according to the present embodiments is modelled. Strikes from different angles and impact locations to points of the electronics are modelled for different particle types and initial energies. Simulated measurements of deposited energy within the different detectors, at different locations, and the particles' LET when impinging the components are used to construct a neural network that may be implemented by the apparatus. Alternatively, the data may be stored as a lookup table, but the amount of data may be rather large.

A further alternative is to feed measurements from the detectors into the Bethe-Bloch formula to estimate the possible LET level in the sensitive component region indicated as a target.

A fourth alternative is to use Monte Carlo modelling to estimate the particle's LET when traversing the component from the particle's estimated LET when traversing the detectors. All the methods are required in some way to take into account statistical variations and measurement errors, for example measurement errors arising from a particle hitting the margins between different pixels of the measurement area, or hitting at a very shallow angle, and the probabilistic behavior of the energy deposited by a particle traversing through matter (Landau distribution).

Either way, the data from the sensors is combined to power the algorithm, and indications of possible expected damage may lead to power cycles.

The method comprises initialization—40, followed by powering on the electronics. 41—Readout electronics from the detectors are triggered, 42—and if a particle is indicated then data is read out from all the detectors—44. An estimate is made of the particle track 46. With the track available a query is issued as to whether any sensitive electronics is located in the particle track—48. If the answer is yes, that is to say sensitive electronics is present in the particle track, then the liberated charge and the particle's LET are estimated—50. A query is initiated—52 as to whether the estimated liberated charge is larger than a predefined threshold. If the estimate exceeds the threshold, the electronics may be experiencing latch-up, and a power cycle is initiated—54. Otherwise, the apparatus resumes waiting until being triggered by incident particles—42.

Figure 5:
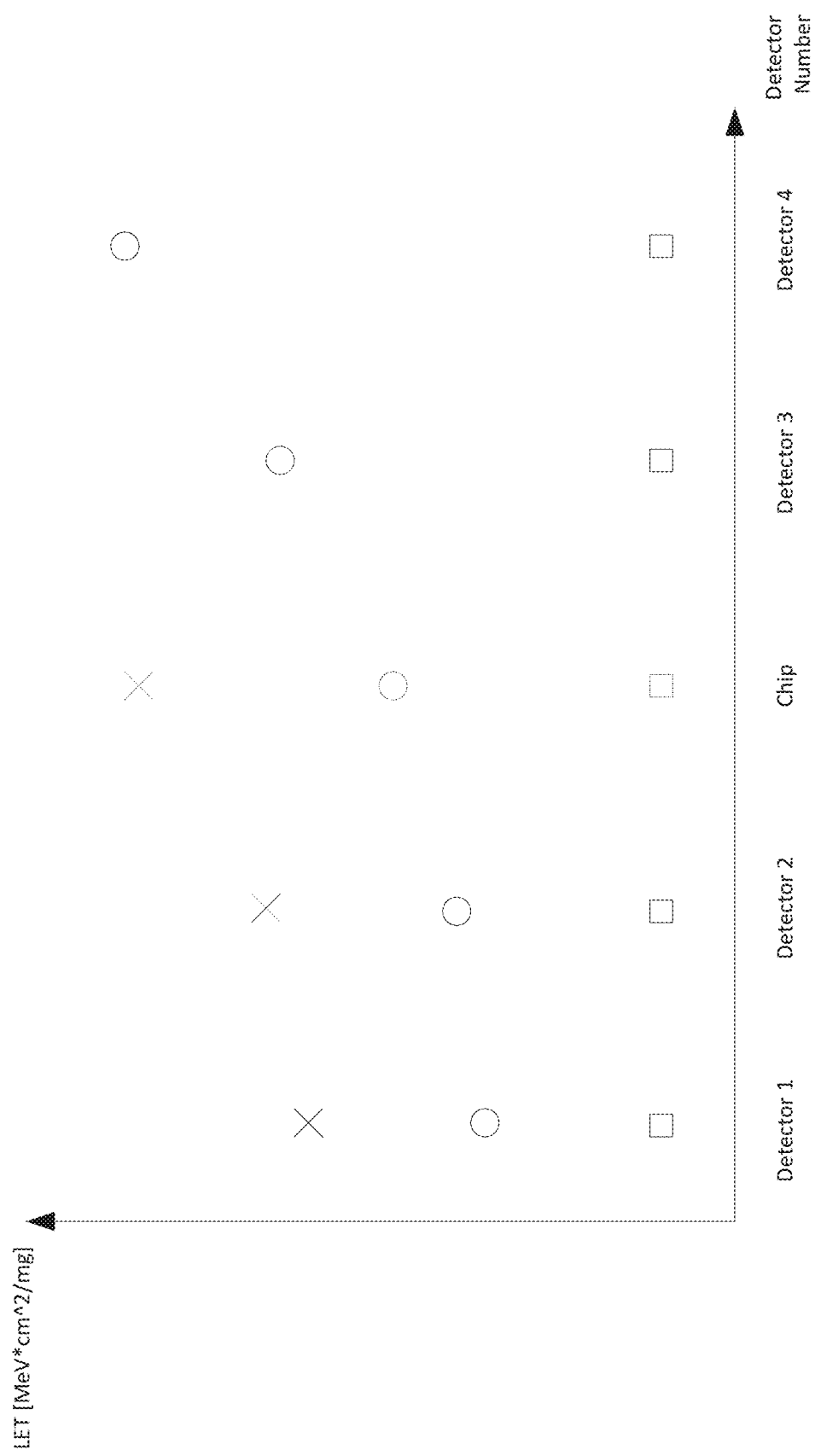
FIG. 5 is a simplified graph of a particle moving within the capsule and the associated LET as a function of position within the capsule.

Referring now to FIG. 5, a graph shows the particle's LET at different detector numbers for three different particles, one indicated by X, one indicated by O, and one indicated by squares. The graph relates to an apparatus with four detectors, two on each side of a protected chip. Three different particles traverse the apparatus and their LETs are depicted at the different detectors and the protected chip. The particle, which has a LET depicted by "X" is detected at detector 1 and detector 2 but not at detectors 3 or 4 and thus it is assumed that a relatively high energy is deposited at the device. The O particle is detected at all four detectors with accumulating LET, it being apparent how much energy is imparted to the chip. The particle indicated by squares is a high energy particle that is detected with roughly the same LET at all detectors and thus the energy this particle deposited within the sensitive component can be estimated with relatively high confidence.

Figure 6:
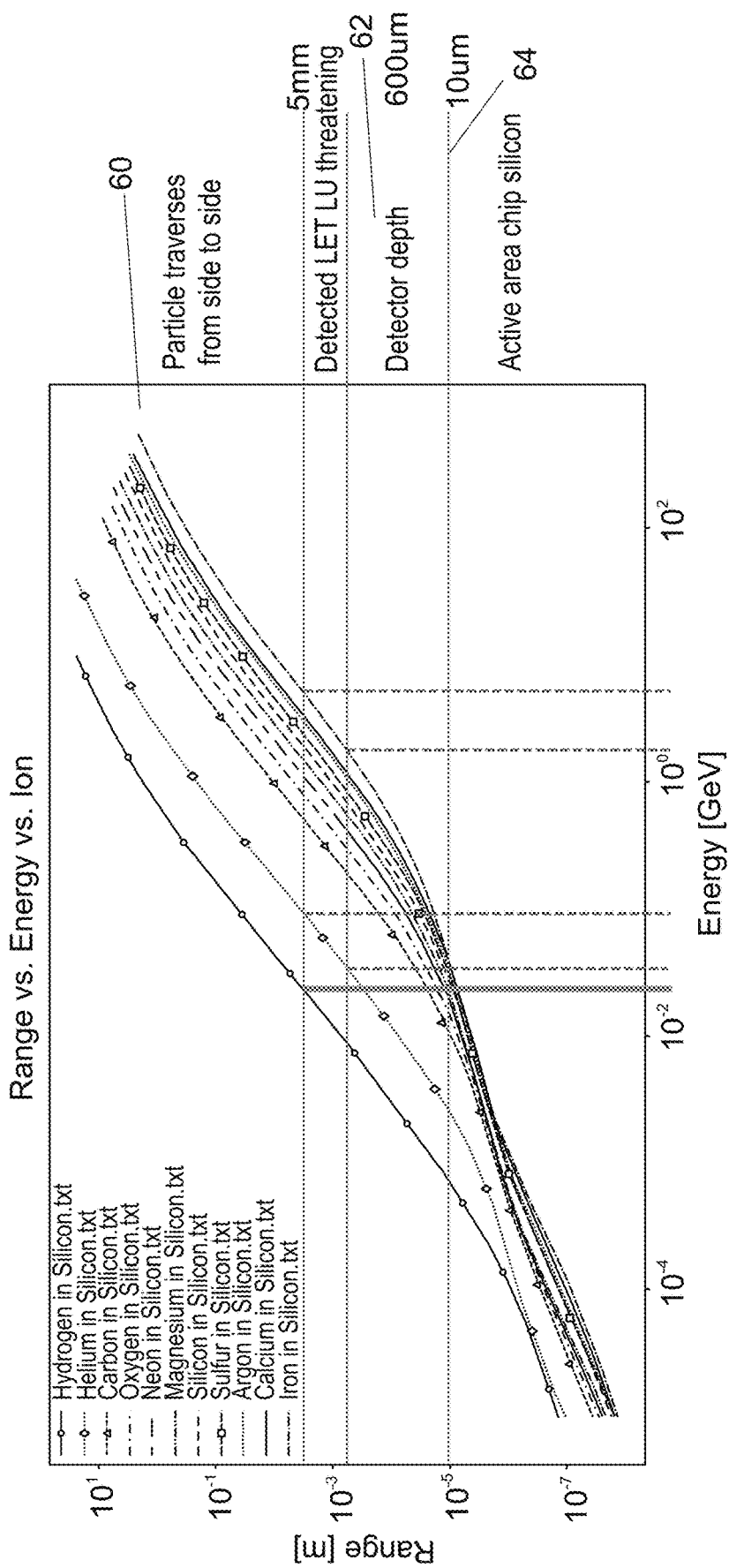
FIG. 6 is a simplified graph showing LET as a function of energy and the type of particle and also showing the passage of the particle through silicon as a function of energy and the type of particle.
Figure 6:
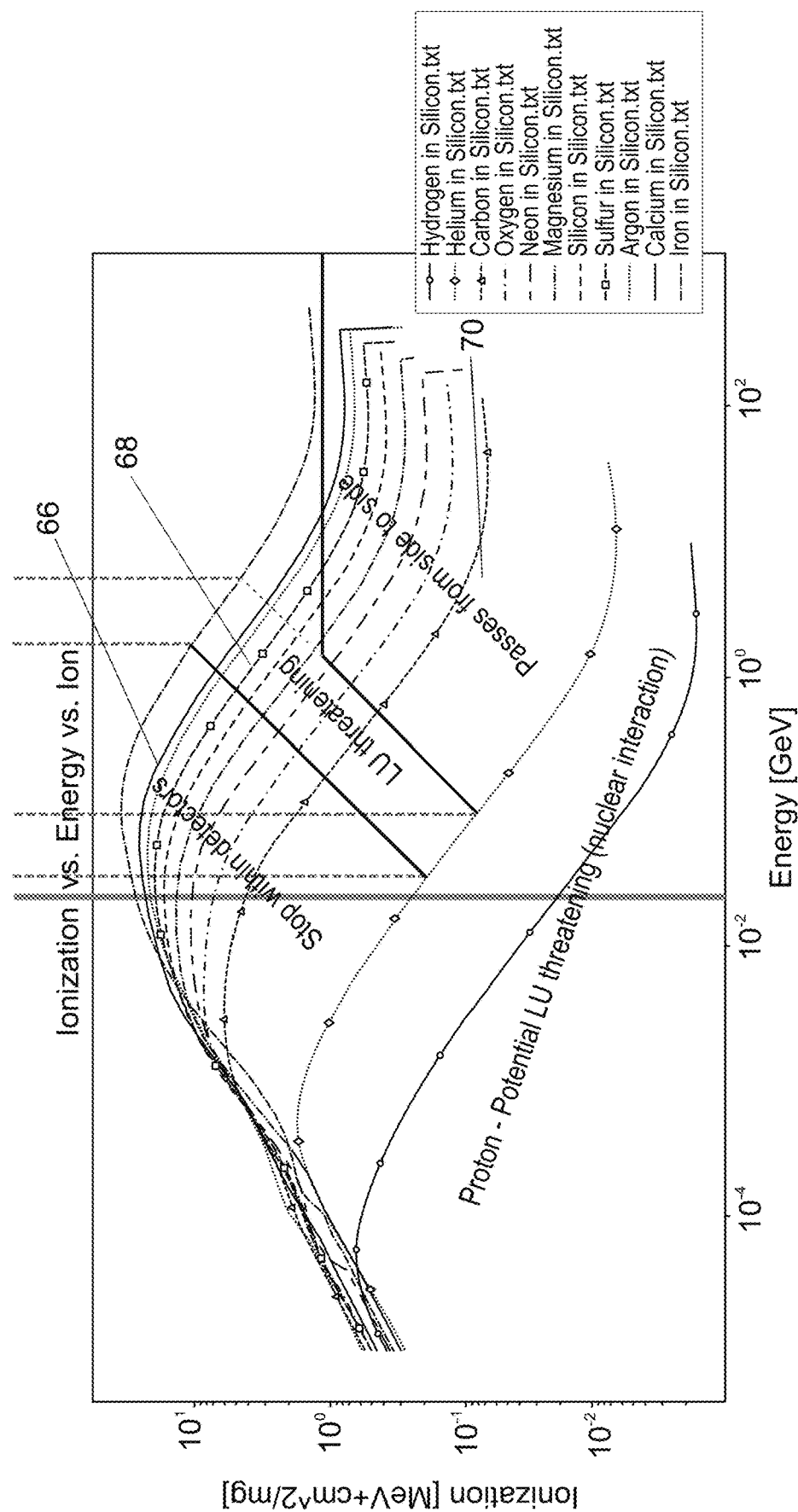

Reference is now made to FIG. 6, which illustrates the threat. The graph shows particle range against energy against type of particle. A particle enters and traverses the apparatus from side to side, 60, and is detected by two detectors over a detector depth—62—here indicated as 600 mm. Each detector is 300 microns thick giving the total detector thickness of 600 microns. The sensitive area of electronics that needs protecting, the active silicon area, 64, is ten microns in thickness, located at the top of the silicon layer. It is assumed that the particle might produce a CSEE only if its LET is larger than LET≥LETth=1.3 MeV*cm²/ mg. Hence for most devices, particles such as protons and helium ions are not likely to cause a CSEE and the condition allows for them to be ignored.

The lower part of FIG. 6 shows the Bethe Bloch curve for the different particles at different energy levels that move within the silicon. The particle LET is shown as a dependency on the particle's energy. The graph may be divided into three regions, stops within detectors 66, LU threatening 68 and passes from side to side, 70. The minimum ionizing particle (MIP) shown in the right hand valley of the graph in region 70, may start with an initial energy of say 2 GeV, and even though it loses energy and slows down, its energy loss per distance increases (it moves upwardly and leftwardly over the curve) until it slows completely and stops in the last few microns of traversing through the material, where its LET reduces to zero.

When a particle exits the interior detector with an energy-species value within the region 68 marked as latch-up (LU) threatening, a power cycle may be required. Particles of a type and energy that are to the left of the LU threatening region are simply absorbed by the 100 um encapsulation above the sensitive silicon of the device. Particles to the right of the LU threatening region, that is region 66, simply pass straight through and reach the apparatus's detectors on the other side of the electronics. These particles, have a relatively low LET, depositing less than the critical amount of energy within the sensitive region of the component and thus not inducing LU.

Thus, accurate measurement and placement of particles on the graph of FIG. 6 would allow for identification of those particles posing a danger.

Figure 7:
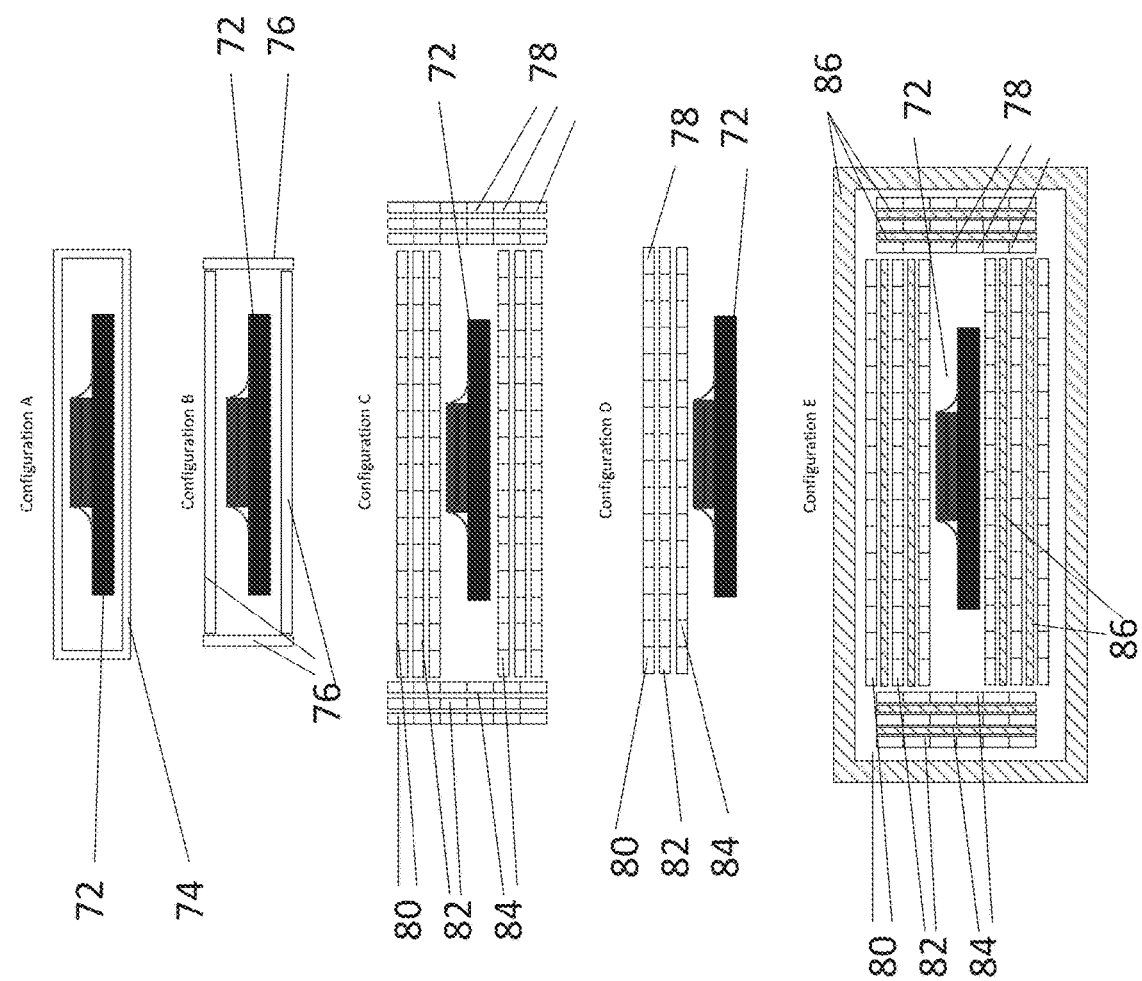
FIGS. 7 and 8 are simplified 2D cutout diagrams showing configurations for protective capsules according to embodiments of the present invention.

FIG. 7 illustrates five different configurations, A . . . E, of possible protective apparatus for holding unmodified electronics in a radiation environment. The figures are all two-dimensional cutouts, so that the front and back faces are not shown, but it will be understood that these may be protected as well.

Configuration A shows a device 72 with a monolithic surrounding detector 74 that can only detect a particle impinging the apparatus and measure deposited energy and neither the position nor direction of the particle.

Configuration B is a version in which each side is a separate detector, that is to say, device 70 is surrounded by separate detectors 76 of which four are shown and two more are present in the third dimension to close the box. Hence some minimal information of location and path are available. The energy is measured as with configuration A.

Configuration C has pixels 78, or any alternative position sensitive detectors in three layers 80, 82, 84, at each side of the box formed around device 72. The configuration allows for accurate detection of the position and track of the particle as well as the deposited energy and estimate of its LET. The six levels of detectors that the particles may pass through allow for increased accuracy of the deposited energy measurement and the particle's LET estimate, and allow estimating the energy deposited within the protected electronic component.

A variation not shown allows for a mix and match between A, B and C. Thus some sides may be monolithic, or some layers of detectors may be monolithic, and the remaining layers or sides may be position sensitive detectors.

Configuration D provides the three layers 80, 82 and 84, of pixel sensors 78 but only from above. Such a configuration may be useful for example in low earth orbit or on the surface of Mars or the Moon, etc., where most of the threat may be expected specifically from above. In this case, if possible, the apparatus and electronics may also be oriented in a manner that reduces the risk of LU and improves the apparatus's performance.

Configuration E is the same as configuration C except that layers of absorptive material 86 are placed around the outside of the apparatus and in between the detector layers 80, 82 and 84. The absorptive material may fully absorb many of the slower moving particles and thus reduce the overall flow and reduce the total ionizing dose. In particular, those slower moving particles which would not in fact reach the electronics but show up to the detectors as having threatening levels of energy, may be removed from the equation, thus reducing the number of unnecessary power cycles. In addition, absorbing material between detectors may be engineered to improve particle characterization due to the increased difference in estimated particle LET per detector and thus better total threat assessment of CSEE from the particle.

It is to be noted, that within a single capsule, numerous types of detectors may be used, thus, scintillator detectors or double sided silicon strip detectors (DSSSD) or detectors with different thicknesses, or mixtures of detectors that detect location with detectors that do not detect location may be used.

The "scintillator detector" is a detector that is based on a bulk of material with optical detectors attached thereto. When a particle strikes the bulk, photons erupt and are detected upon impinging the optical detectors. The material may be plastic, say based on Polyvinyl toluene, based on crystal scintillators and others. The optical detectors may be of various types known in the art, such as silicon photomultipliers or photomultiplier tubes or PIN diodes or others. Components such as wavelength shifting fibers and simple light guides may be added.

Semiconductor detectors may be used instead. In these cases, the particle strikes a doped semiconductor directly, depositing energy which may be measured.

Semiconductor detectors may include double sided strip detectors (DSSD), duo-lateral position sensitive detectors, tetra-lateral position sensitive detectors, and single sided strip detectors (SSSD), as well as matrix (pixel) and monolithic detectors, drift detectors and others. Also, gas-based detectors, liquid based detectors, MEMS detectors and others may be used.

Figure 8:
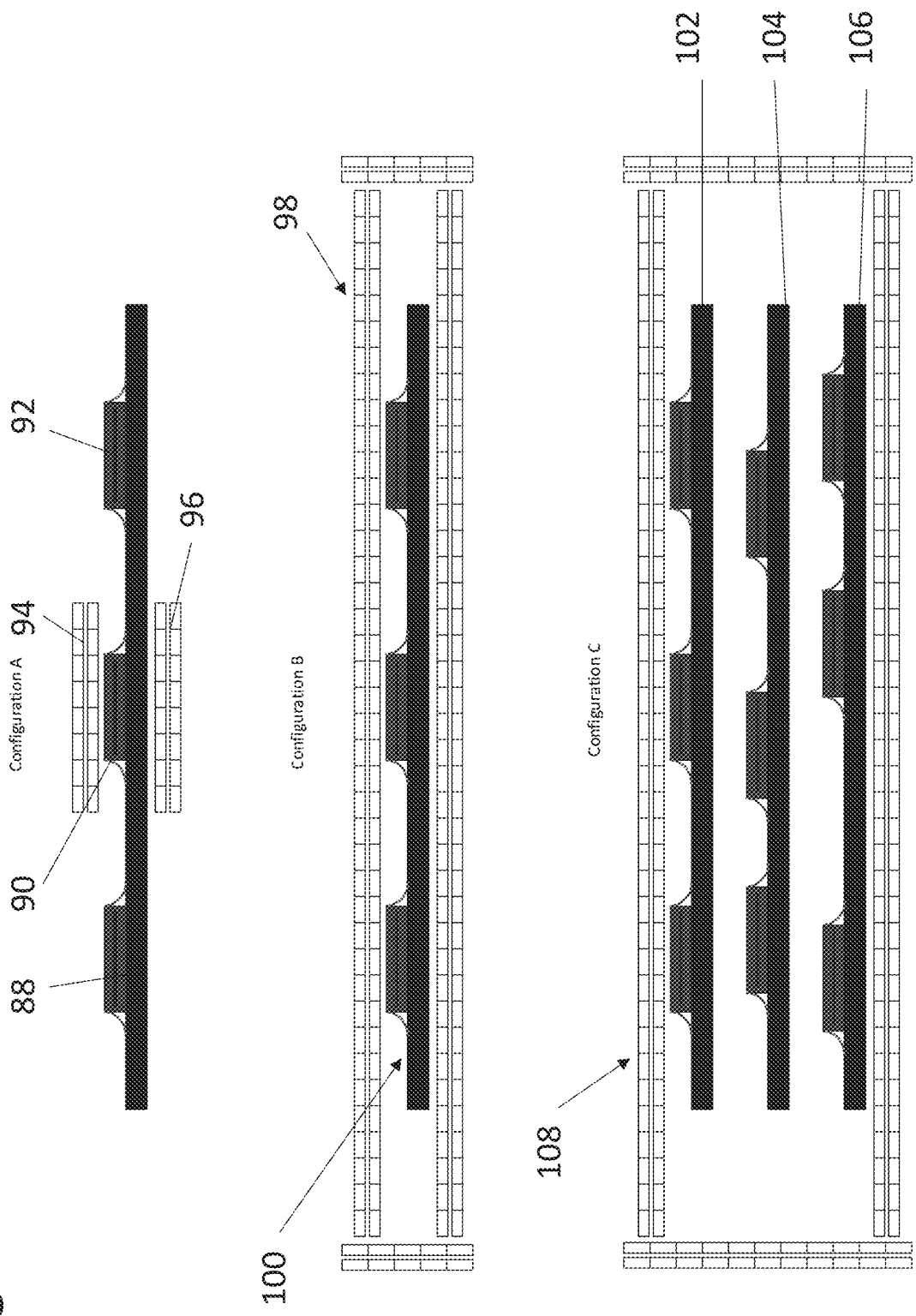

Reference is now made to FIG. 8, which illustrates a series of different configurations A, B and C, from the point of view of the chips or devices stored within the capsule. Configuration A shows three devices 88, 90 and 92, on an electronic board, but only a single device 90 is protected by the detectors between double detector layers 94 and 96. This may be useful if a given chip is more mission critical or more sensitive (component-level protection). A monolithic sensor or other lower level of protection may additionally be placed over the remaining chips.

Configuration B is a capsule 98 protecting a single card 100 having multiple chips (board-level protection). Configuration C shows multiple cards 102, 104 and 106 within a single capsule 108 and may extend to having all of the electronics of a satellite within a single, all-encompassing capsule. In further embodiments, additional detectors may be added between the layers of electronic cards (system-level protection).

Figure 9:
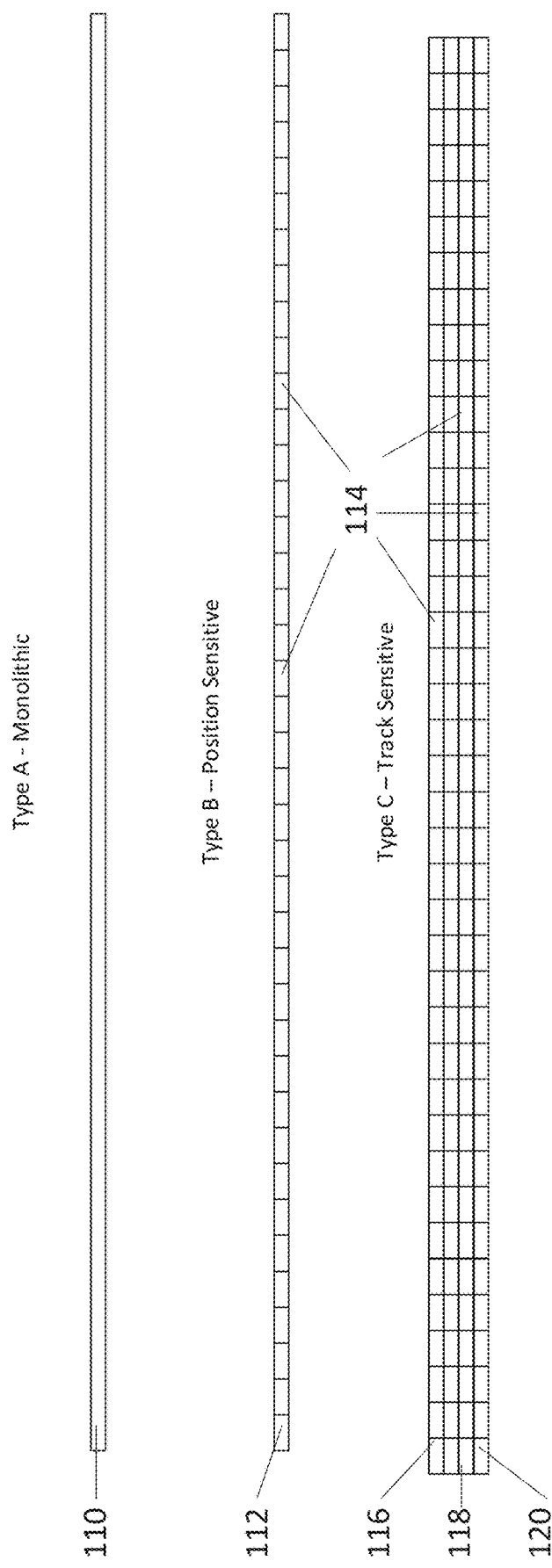
FIG. 9 is a simplified schematic diagram showing different configurations of detector for use with the present embodiments.

Reference is now made to FIG. 9, which illustrates three different arrangements of detectors as layers of the capsule. Configuration A comprises a monolithic detector 110, and only detects deposited energy. Configuration B comprises a single layer 112 of pixel detectors 114, and detects both position and deposited energy. Configuration C comprises three layers 116, 118 and 120 of pixel detectors 114 and most accurately detects the position, track and deposited energy of the incoming particle, at every layer.

Figure 10:
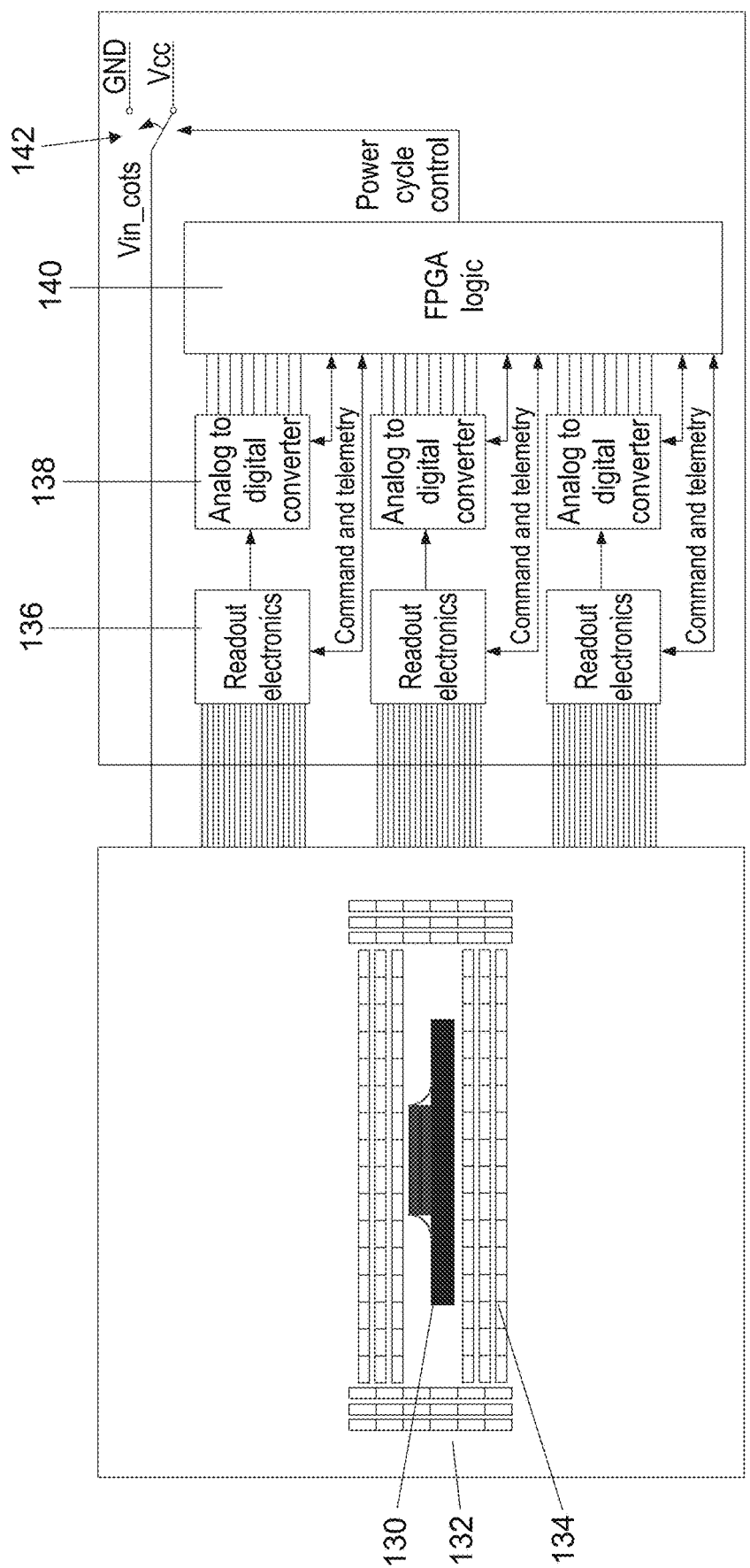
FIG. 10 is a simplified diagram illustrating exemplary control electronics for carrying out the method discussed with respect to FIG. 4.

Reference is now made to FIG. 10 which is a simplified schematic diagram showing exemplary electronics for converting the detection of a particle event into a decision on power cycle control. Electronic device 130 is enclosed by triple layer detector walls 132, each having multiple pixel detectors 134 so that directional detection is possible. After impinging on one or more detectors, readout electronics 136 measures the magnitude of the detected energy and the location of the detecting pixel. The data is converted to digital format in A/D convertors 138 and fed to the signal processing FPGA logic circuit 140 which reads the output of the different A/D converters in parallel. The logic circuit embodies the decision making process discussed above with respect to FIG. 4 to decide whether the particle has traversed the device with dangerous levels of LET. If this is the case, then switch 142 may be used to initiate a power cycle for the electronics that is at risk.

Power cycling may involve disconnecting the power to the card or chip that is at risk or also clamping the output of the power supply to the ground, say in order to expedite discharge of any capacitance in the circuit. The power cycle control may need to occur within a short period of time, for example a millisecond or less depending on the device, from the moment the sensitive component is struck by the particle in order to ensure that damage does not develop. In practice, some circuits may allow more time for discharging before damage occurs but this is not guaranteed and may be determined on an individual basis.

Reference is now made to FIG. 11, which illustrates a board with a chip 150 and two paths 152 and 154 travelled by two particles A and B. Particle B travels perpendicularly through the chip while particle A travels at an oblique angle. The amount of energy deposited by the particle into the device, and into the detectors, depends on the path length of the particle when traversing the device, so that particle A deposits a larger proportion of its energy in the device than does particle B. Thus, even if particle A and B have the same characteristics, particle A may still be a greater threat than particle B due to the angle of incidence.

A capsule according to the apparatus of the present embodiments may be used in different ways for different purposes and different types of mission. High reliability missions may induce power cycles for the slightest threat, thus protecting the equipment from any likely damage. The high number of power cycles may cause disruption to regular operation. Such a setting may be used for high reliability missions and critical systems, etc. For a satellite-based mission Pareto setting, say by detecting and power cycling the device for 80% of the threatening particle events, may be sufficient to increase the endurance and lifespan of the satellite's electronics fivefold, without excessive use of power cycles. A Pareto setting, combined with some system redundancy, or with satellite redundancy per mission, may provide for sufficiently high-reliability, long-lifespan missions.

The capsule of the present embodiments may be combined with other latch-up mitigating measures. Redundancy has been mentioned above, both hot and cold redundancy may be used, and the capsule may be combined with current measurement as another indicator that can be combined with the radiation estimate so, for example, when an estimated potentially dangerous particle has been detected and is expected to traverse the protected device, and in addition a small current increase is also detected simultaneously, a combined decision can be taken to trigger a power cycle. For many devices, monitoring current change alone is not sufficient as computer chips and the like often change their draw of current considerably during normal use. Furthermore, electronics may be powered down entirely for longer periods during a solar storm event, or passage through the South Atlantic anomaly, or the like.

It is possible to improve the performance of the apparatus by testing some or all of the electronic components to measure their sensitivity to CSEE, and thus for their ability to withstand radiation. This will provide information on the LETth for the tested components and help calibrate the apparatus. The information could be used by an associated algorithm to better handle a particle event and reduce the rate of power cycles it performs.

Components may be tested with heavy ions. However, such testing is expensive and takes time and effort. A somewhat faster and lower cost method is to test the components with protons alone, which is cheaper and is a considerably faster and more accessible procedure than testing with ions. If all the components within the capsule have been tested to withstand a large fluence of protons, then the overall LETth required to induce catastrophic SEE can be estimated and may be higher than the estimate for untested devices. Only particles impinging with higher levels of LET need to be protected against, thus considerably reducing the rate of required power cycles. For example, it may be assumed that successfully proton tested electronics are able to withstand LET≤LETth~=8 MeV*cm$^2$/mg.

Instead of actual testing, components may be categorized or selected on the basis of experience. Thus, certain technologies, makes and manufacturers and materials and manufacturing processes may be known to produce more CSEE resilient devices.

In some cases of traversing particles, the apparatus may be required to test the electronics and ensure correct operability, say by putting it through a testing cycle, and/or may ensure that the device repeats whatever function or calculation was interrupted by the traversing particle and the consequent power cycle being performed.

Figure 12:
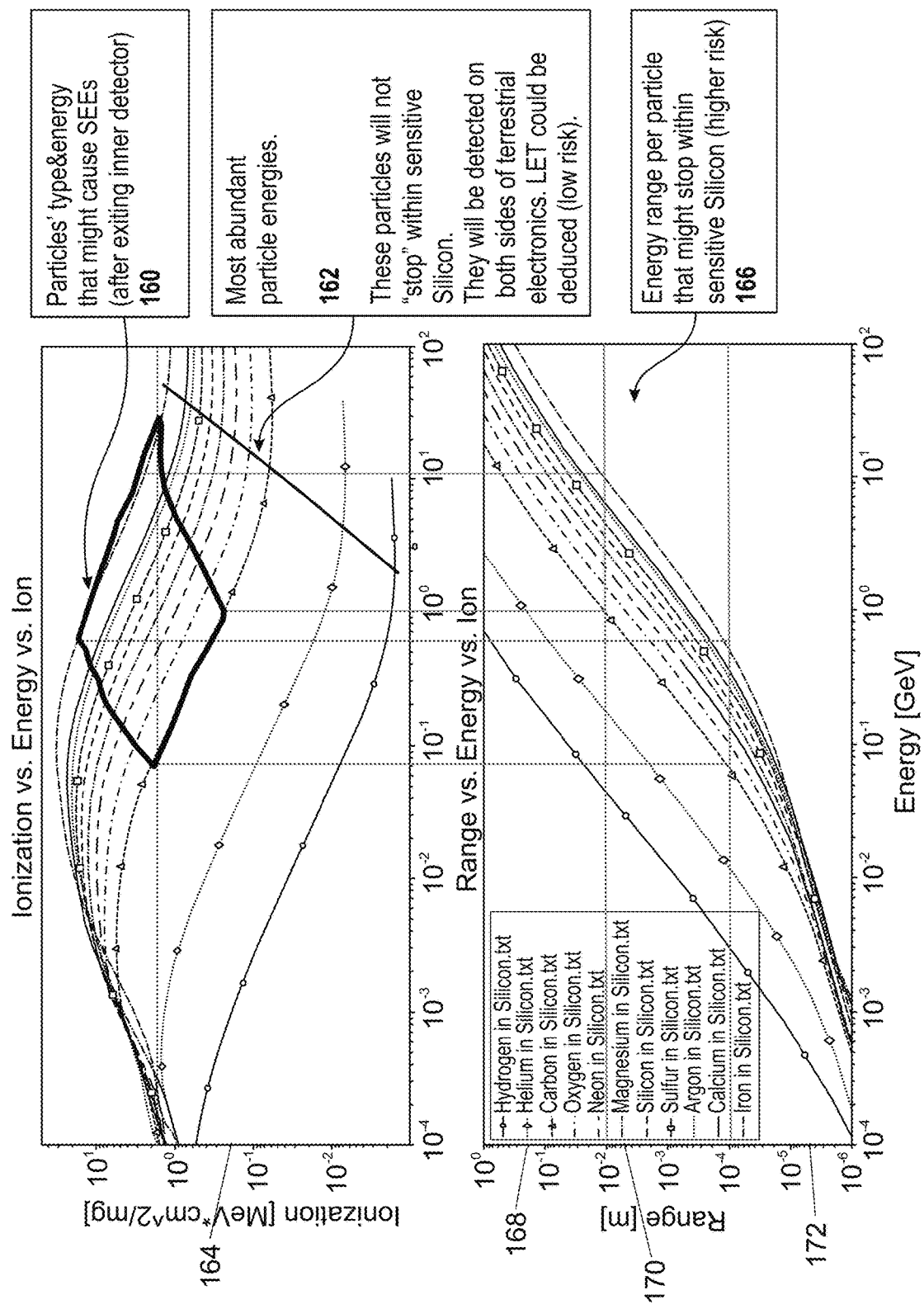
FIG. 12 is an alternative version of the graph of FIG. 11.

Reference is now made to FIG. 12, which is an updated version of the graph of FIG. 6, with more precise results. The upper graph shows LET v. energy v. ion type for a detected particle. Particles within the area marked by the approximately rectangular enclosure 160 are those that may cause SEEs after exiting the inner detector and impinging the radiation-sensitive electronics. Particles indicated by line 162 are the most abundant cosmic energies found and will not be expected to stop within sensitive silicon. They would thus be detected at both sides of the electronic device and the LET could be deduced to indicate low risk.

Region 164 illustrates particles with type-energy characteristics that have a LET that is lower than the minimum LETth that may induce a CSEE. Thus, the device is not sensitive to these particles in these energies, as the LET is lower than the threshold for causing damage.

The lower part of the graph shows energy v. range v. ion type and region 166 indicates particles that may stop, and hence transfer their energy, within sensitive silicon. Region 168 shows high energy particles that may be expected to go through the entire array and exit the far side with relatively little transfer of energy. Region 170 is the same as region 166, where the particles are stopped within the sensitive silicon of the devices, and region 172 illustrates the region where the particles are stopped in the device's enclosure even before reaching the sensitive silicon (or other semiconductor) of the sensitive device, that is less than 100 um thickness of encapsulation.

Reference is now made to FIG. 13, which is a simplified graph depicting the normalized LET of particles traversing through matter vs. the distance traveled by the particles through the matter. While traversing through the material, the particles loose energy until they lose all of their initial energy and come to a complete stop. It is clear that the particles have the highest LET and thus are most dangerous to sensitive electronics if they come to a complete stop within the device.

The apparatus of the present embodiments may be used as a means for radiation monitoring for purposes such as malfunction investigation. Information from the apparatus may be combined with actual device failures to determine that a device is more sensitive to catastrophic SEE than was thought. Thus a particle may be detected and characterized but no power cycle is initiated. If the device is found to have failed following such an event then it is clear that the settings or the device's performance need to be investigated. Thus the settings may be updated to more appropriate levels, say on surviving electronics, particularly on any redundant electronics or on the same device on other craft and the like. It is noted that in addition to protecting devices inside an apparatus, according to the present embodiments, the rate of detected particles and their type and energy may be used as a general indication of the local conditions in space, providing information on the well-being of the craft, information on radiation events that might otherwise be unknown to us but may cause upsets and malfunctions in space, and thus allowing malfunctions and problems to be investigated. Such an apparatus could be used for real-time monitoring of radiation and radiation events in space, both for scientific and for satellite maintenance and house-keeping operations as well as navigation purposes and attitude control. Having multiple apparatuses on different satellites, in different orbits and locations could be valuable for such uses.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment and the present description is to be construed as if such embodiments are explicitly set forth herein. Conversely, various features of the invention, which are, for brevity, described in the context of a single embodiment, may also be provided separately or in any suitable subcombination or may be suitable as a modification for any other described embodiment of the invention and the present description is to be construed as if such separate embodiments, subcombinations and modified embodiments are explicitly set forth herein. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. Apparatus for protection of electronics in a radiation-prone environment from incoming particles liable to cause damage via energy deposition, the apparatus comprising:
at least first and second radiation-detecting layers covering at least partially at least two sides of at least one radiation-sensitive electronic device to be protected, wherein the said at least first and second radiation detecting layers are configured to obtain a track of said detected particle, the at least first and second radiation-detecting layers being configured to obtain an estimation of a type of said detected particle and a difference in energy of said detected particle measured between said at least two radiation detection layers respectively;
a stress assessment unit configured to determine whether said type and said measured difference in energy of the incoming particle implies the particle may be a threat to the radiation-sensitive electronic device; and
a protection module associated with the stress-assessment unit and configured to power down the radiation-sensitive electronic device within a predetermined time after the incoming particle has been detected, thereby to protect the radiation sensitive electronic device from damage due to the detected particle, or to issue an indication that a current operation of said at least one radiation-sensitive electronic device is unreliable.

2. The apparatus of claim 1, wherein the predetermined time is within an order of magnitude of a millisecond.

3. The apparatus of claim 1, wherein the at least first and second radiation detecting layers are a monolithic detector or a position-sensitive detector.

4. The apparatus of claim 3, wherein said position sensitive detector comprises a plurality of pixel sensors.

5. The apparatus of claim 1, further comprising at least third radiation detecting layers, said first and second and third detecting layers being on at least one side, or at least two sides or at least three sides, or at least four sides or at least five sides or six sides of the protected device.

6. The apparatus of claim 5, comprising at least four radiation detecting layers, or at least four radiation detecting layers on a first side, or at least four radiation detecting layers on at least two sides, or at least four radiation detecting layers on at least three sides, or at least four radiation detecting layers on at least four sides, or at least four radiation detecting layers on at least five sides, or at least four radiation detecting layers on six sides of the protected device.

7. The apparatus of claim 1, wherein said protection module is configured to power down said device only if said at least one device is aligned with said track.

8. The apparatus of claim 7, wherein said protection module is configured to determine whether a given portion of a device is at risk and to power down said portion without powering down other portions of said device or other devices.

9. The apparatus of claim 1, further comprising a current detection unit configured to detect a current surge in said at least one device, the protection module configured to power down said radiation sensitive electronic device only if said implied threat is combined with said detected current surge.

10. The apparatus of claim 1, wherein said stress assessment unit is configured to consider one member of the group consisting of:
- an energy absorbed by said at least one radiation detecting layer in order to estimate an LET of a respective particle; and
- an angle at which said incoming particles approach said radiation sensitive device, thereby to determine a path length of said incoming particles within said radiation sensitive device, said path length including an estimate as to whether a particle will be stopped within said radiation-sensitive electronics, in order to estimate a linear energy transfer (LET) of said particle.

11. The apparatus of claim 1, wherein said at least one radiation-sensitive electronic device to be protected comprises a plurality of said radiation-sensitive electronic devices in a plurality of device layers, and/or comprising at least one additional radiation detecting layer between said device layers.

12. The apparatus of claim 1, containing at least two radiation sensitive devices, wherein a first one of said radiation sensitive devices is at least partially covered by a position sensitive detector and a second one of said radiation-sensitive devices is at least partially covered by a monolithic detector.

13. The apparatus of claim 1, wherein said powering down comprises one member of the group consisting of clamping a rail or node to ground and disconnecting a power input.

14. The apparatus of claim 1, comprising at least one radiation detecting layer on each of six sides surrounding said at least one radiation sensitive device, thereby to form a closed capsule.

15. The apparatus of claim 1, wherein said at least one characteristic of said incoming particle comprises at least one member of the group consisting of a measurement of the deposited energy, an estimation of the LET, and ones of said radiation detection layers traversed.

16. Method for protection of electronics in a radiation-prone environment from incoming particles liable to cause damage, the method comprising:
- placing at least two layers covering at least partially at least two sides of at least one radiation-sensitive electronic device to be protected;
- at said layer detecting incoming particles and their energies;
- obtaining a measurement of an energy characteristic of said incoming particle at each of said at least two layers;
- determining whether said measurements imply a threat to the radiation-sensitive electronic device; and
- powering down the radiation-sensitive electronic device within a predetermined time after the incoming particle has been detected, thereby to protect the radiation sensitive electronic device from damage due to the detected particle, or
- providing an indication that a current operation carried out by said radiation sensitive electronic device is unreliable.

17. The method of claim 16, further comprising providing at least a third layer around at least one side of said at least one radiation sensitive electronic device.

18. The method of claim 17, comprising providing at last four layers around at least one side of said at least one radiation-sensitive electronic device.

19. The method of claim 17, comprising providing at last six layers around said at least one radiation-sensitive electronic device, each layer forming a side of an enclosed protective container.

20. The method of claim 17, comprising obtaining tracks of said incoming particles and powering down said at least one said radiation-sensitive electronic device only if said at least one device is aligned with said track.

21. The method of claim 20, comprising:
- determining from said tracks whether a given portion of said at least one radiation-sensitive electronic device is at risk; and
- powering down said portion without powering down other portions of said at least one radiation-sensitive electronic device or other devices.

22. The method of claim 16, further comprising detecting a current surge in said at least one radiation-sensitive electronic device, and/or the protection module configured to power down said at least one radiation sensitive electronic device only if said implied threat is combined with said detected current surge.

23. The method of claim 16, comprising determining an angle at which said incoming particles approach said at least one radiation sensitive electronic device, thereby to determine a path length of said incoming particles within said at least one radiation-sensitive electronic device, in order to estimate linear energy transfer (LET) of respective particles, and/or subtracting an energy absorbed by said at least one radiation detecting layer in order to estimate said LET.

24. The method of claim 16, wherein said powering down comprises one member of the group consisting of clamping an output to ground and disconnecting a power input.

* * * * *